(12) United States Patent
Bacardit

(10) Patent No.: US 7,194,946 B2
(45) Date of Patent: Mar. 27, 2007

(54) PNEUMATIC SERVOMOTOR FOR POWER-ASSISTED BRAKING, THE SERVOMOTOR HAVING A CRIMPED DIAPHRAGM

(76) Inventor: Juan Simon Bacardit, Calle Mallorca 451 6°, 4A - 08013, Barcelone-Espagne (ES)

( * ) Notice: Subject to any disclaimer, the term of this patent is extended or adjusted under 35 U.S.C. 154(b) by 371 days.

(21) Appl. No.: 10/959,475

(22) Filed: Oct. 6, 2004

(65) Prior Publication Data
US 2005/0072296 A1    Apr. 7, 2005

(30) Foreign Application Priority Data
Oct. 6, 2003    (FR) .................................. 03 11695

(51) Int. Cl.
*F15B 9/10*    (2006.01)
(52) U.S. Cl. .................. 91/369.2; 91/376 R; 92/99
(58) Field of Classification Search ............... 91/369.1, 91/369.2, 376 R; 92/99
See application file for complete search history.

(56) References Cited

U.S. PATENT DOCUMENTS

| | | | | |
|---|---|---|---|---|
| 2,680,349 A | * | 6/1954 | Hill et al. ............... | 60/555 |
| 3,037,487 A | * | 6/1962 | Brooks .................. | 91/376 R |
| 3,165,031 A | * | 1/1965 | Rockwell ............... | 91/369.4 |
| 4,270,353 A | * | 6/1981 | Thomas et al. .......... | 60/547.1 |
| 4,366,612 A | * | 1/1983 | Dorsett et al. ........... | 29/454 |
| 5,228,377 A | * | 7/1993 | Watanabe ............... | 91/376 R |
| 6,829,976 B2 | * | 12/2004 | Wake ..................... | 91/376 R |

* cited by examiner

*Primary Examiner*—Hoang Nguyen
(74) *Attorney, Agent, or Firm*—Leo H. McCormick, Jr.; Sarah Taylor

(57) ABSTRACT

A pneumatic servomotor (12) for power-assisted braking for a motor vehicle, which servomotor is of the type having a substantially cylindrical rigid casing (16) inside which a moving transverse partition (18) is movably mounted that has a peripheral skirt (28) which is made of sheet metal and which is covered, at least in the vicinity of its periphery (40), with a sealing diaphragm (30) made of an elastomer material and whose periphery (32) is fixed to the casing (16) in leaktight manner, said servomotor being characterized in that, in the vicinity of the periphery (40) of the skirt (28), the skirt is provided with a stamped annular recess (42) defining an internal groove (44) which serves to receive snugly a peripheral bead (46) which projects from the surface of the diaphragm (30) in order to fix the diaphragm (30) to the skirt (28) in leaktight manner.

12 Claims, 6 Drawing Sheets

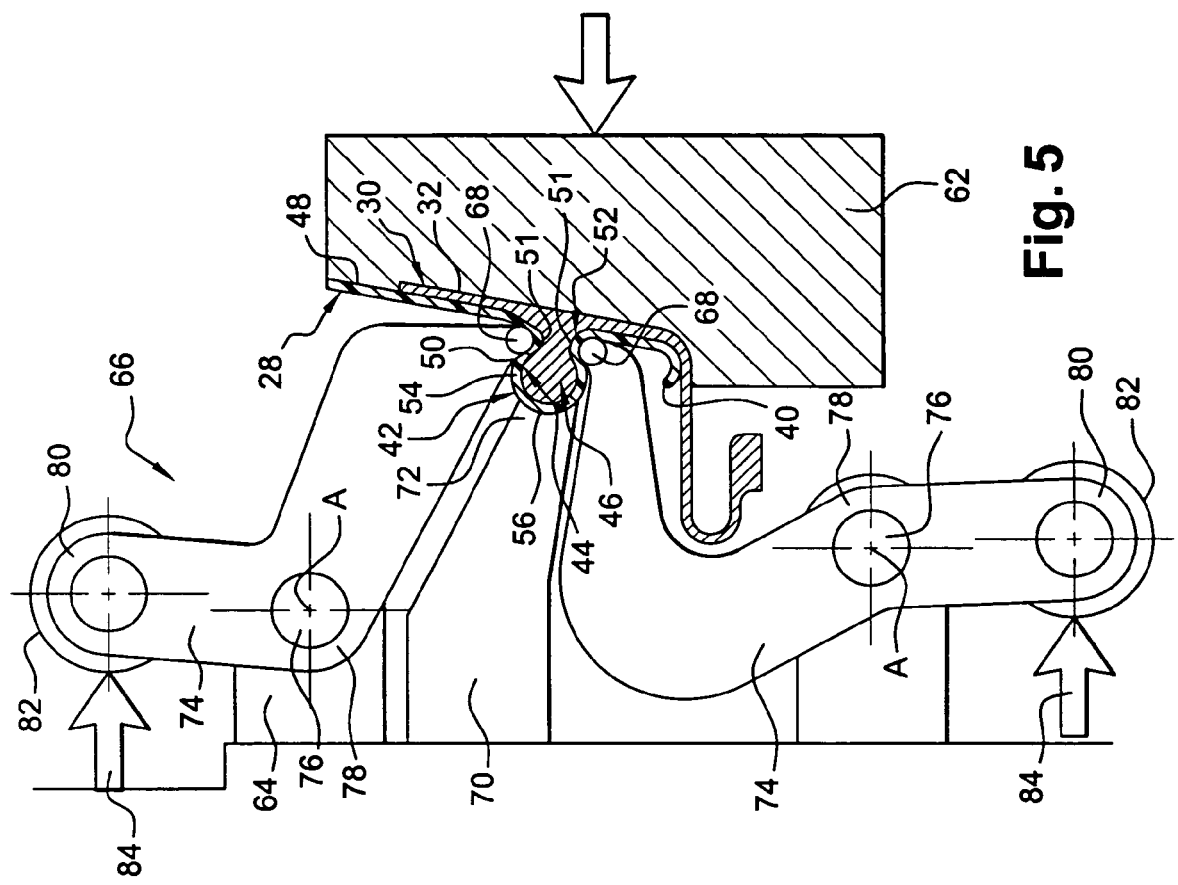
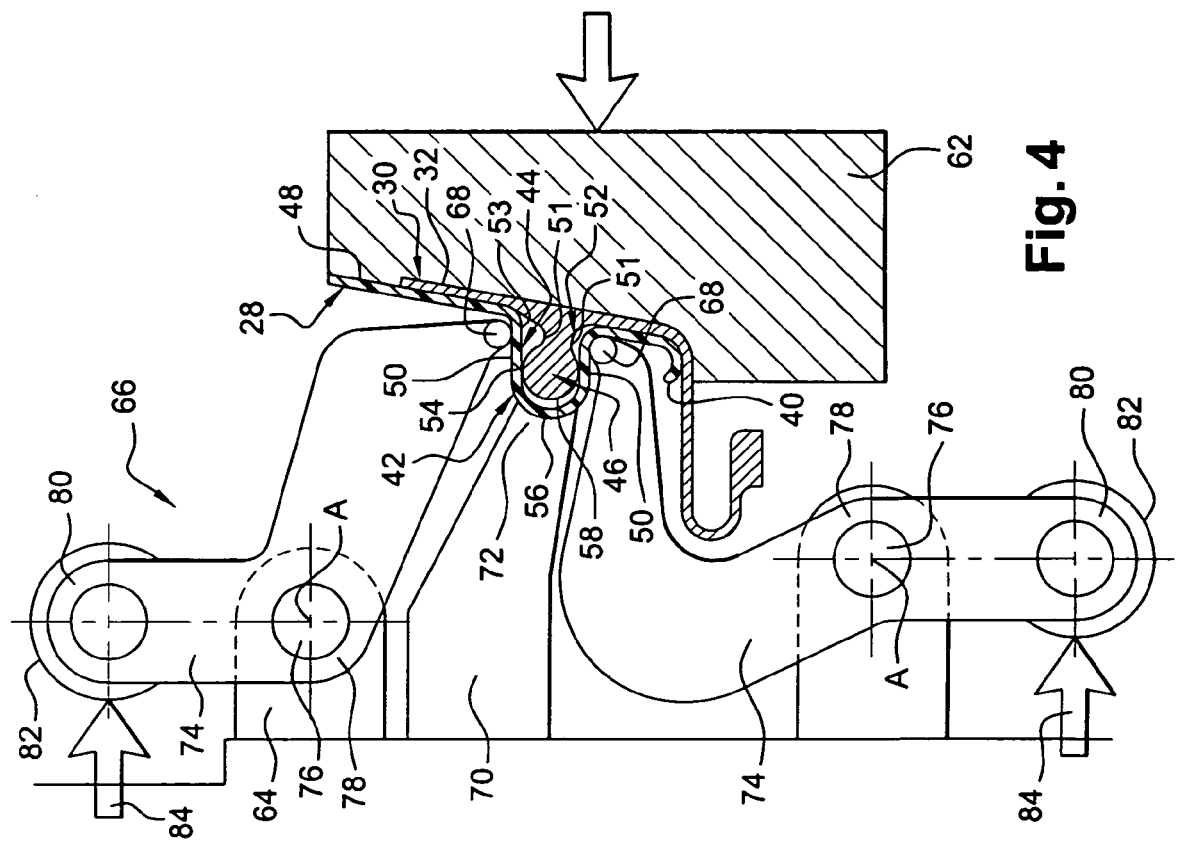

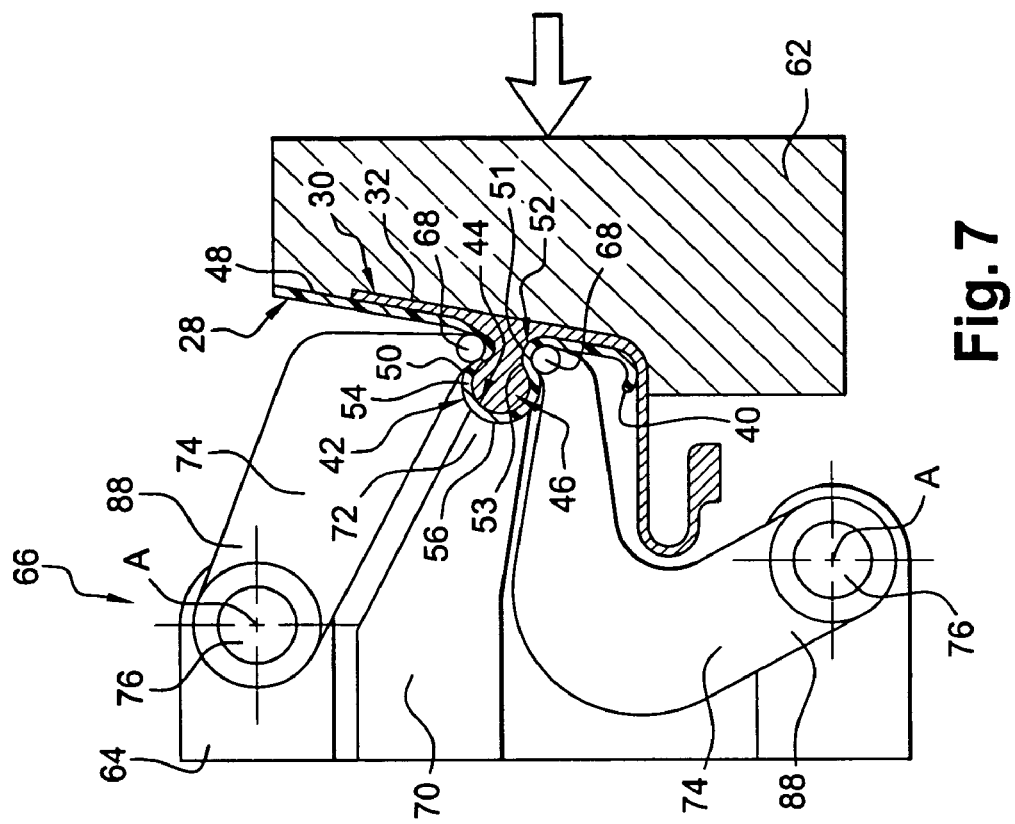
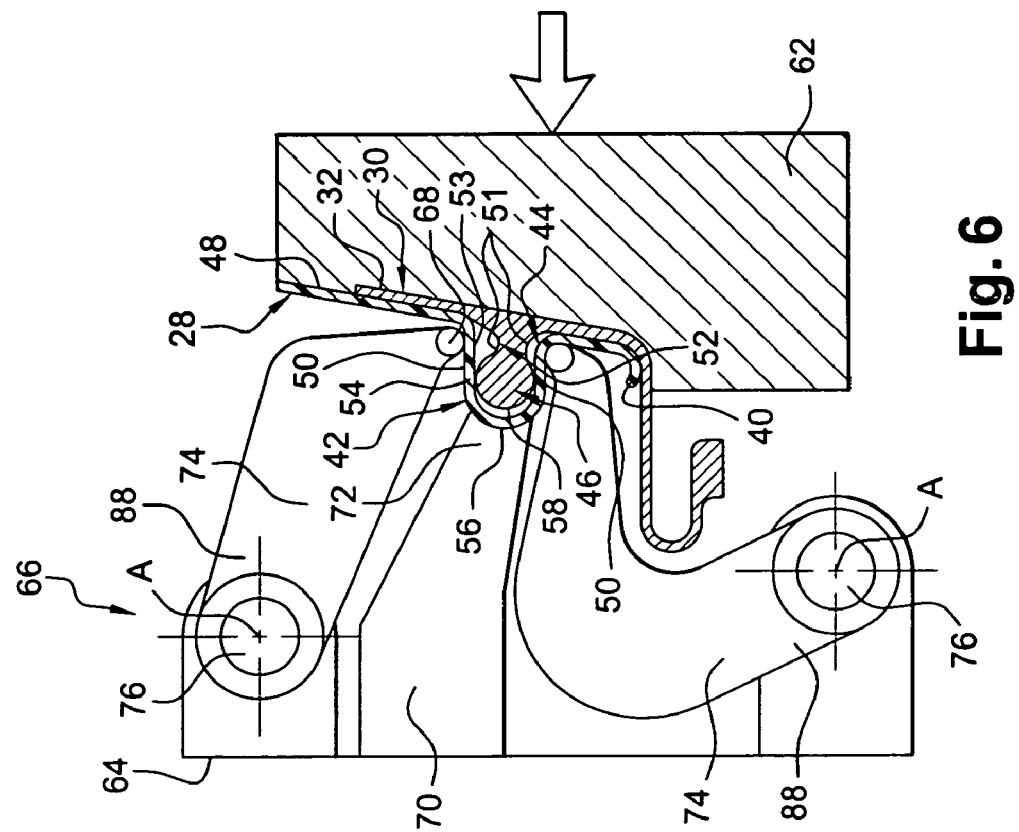

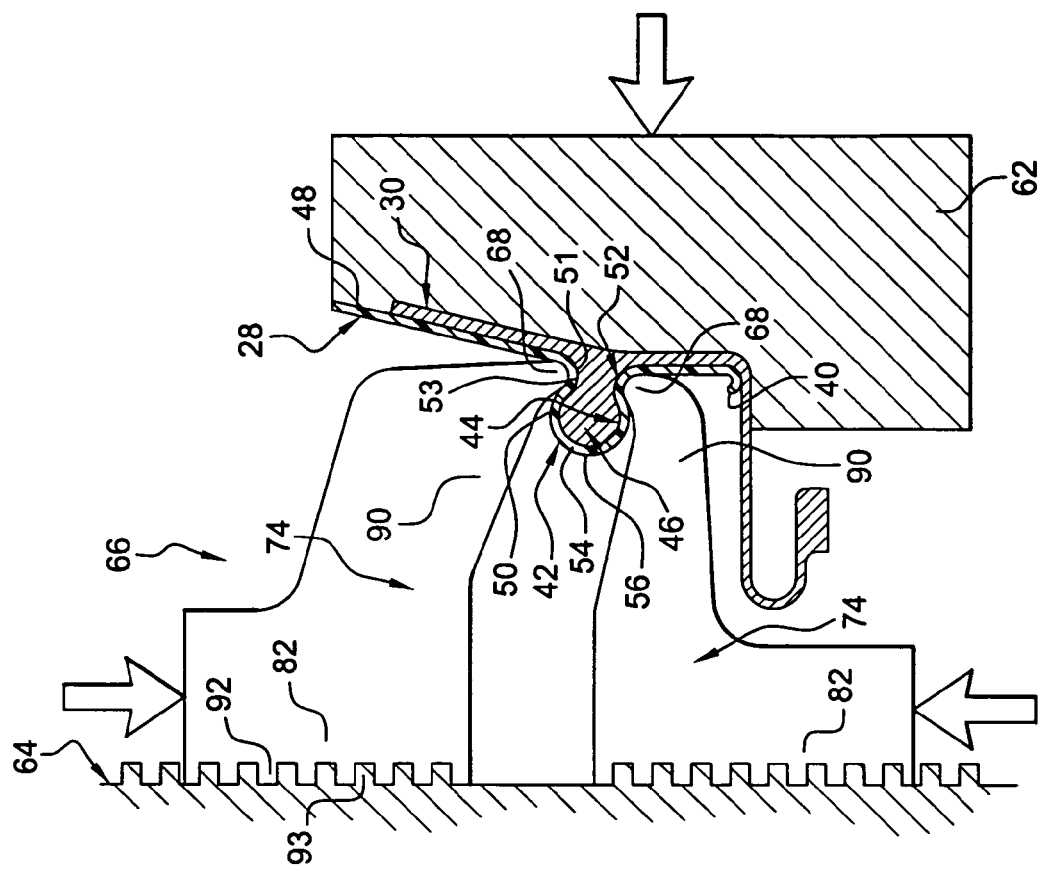
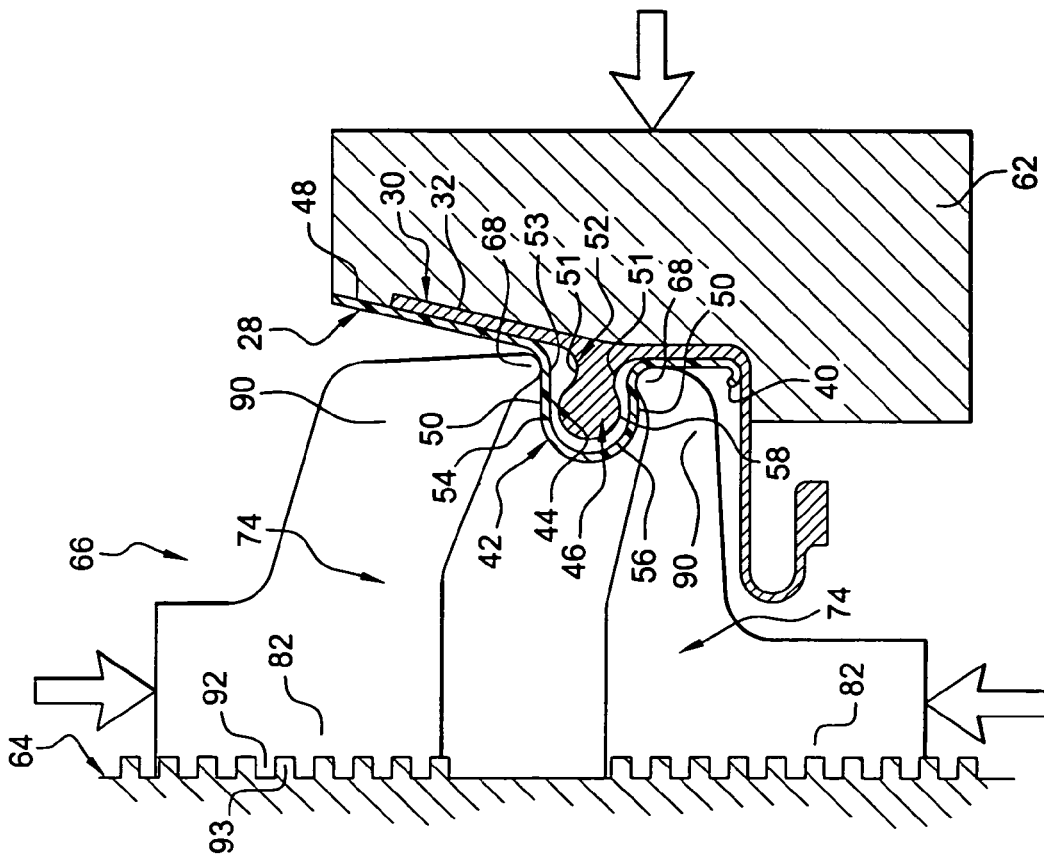

PNEUMATIC SERVOMOTOR FOR POWER-ASSISTED BRAKING, THE SERVOMOTOR HAVING A CRIMPED DIAPHRAGM

The invention relates to a pneumatic servomotor for power-assisted braking.

The invention relates more particularly to a pneumatic servomotor for power-assisted braking for a motor vehicle, which servomotor is: of the type having a substantially cylindrical rigid casing inside which a moving transverse partition is movably mounted that is coupled to an actuating rod for actuating an associated master cylinder, and that defines in leaktight manner and inside the casing two pressure chambers that are suitable for being subjected to different pressures in order to actuate the actuating rod for actuating the associated master cylinder; of the type in which the moving transverse partition has a central piston that is secured to a peripheral skirt which is made of sheet metal and which is covered, at least in the vicinity of its periphery, with a sealing diaphragm made of an elastomer material and whose periphery is fixed to the casing in leaktight manner.

Numerous examples of servomotors of this type are known.

In conventional manner, the diaphragm is fixed to the skirt of the servomotor firstly where the skirt meets the central piston and secondly at the periphery of the skirt.

That design requires the diaphragm to cover the skirt entirely. In addition, it raises numerous sealing problems, firstly where the skirt meets the piston, where sealing must be provided between three elements, and secondly at the periphery of the skirt, which periphery constitutes a zone over which the diaphragm is subjected to high traction forces because the diaphragm is fixed over its periphery to the casing of the servomotor.

In order to remedy those drawbacks, the invention proposes a servomotor of the above-described type that includes improved sealing means interposed between the skirt and the diaphragm in an intermediate portion of the skirt.

To this end, the invention provides a servomotor of the above-described type, characterized in that, in the vicinity of the periphery of the skirt, said skirt is provided with a stamped annular recess defining an internal groove which serves to receive snugly a peripheral bead which projects from the surface of the diaphragm in order to fix said diaphragm to the skirt in leaktight manner.

According to other characteristics of the invention:

in the vicinity of the surface of the skirt, the recess has outer edges which serve to be flattened towards each other to close the internal groove locally onto a curved neck of the bead to hold the diaphragm stationary axially relative to the skirt;

the walls of the recess meet at a substantially rounded end-wall; and the bead has a rounded end arranged on the side of the neck remote from the surface of the diaphragm, and that is complementary to the rounded end-wall of the recess inside the groove.

The invention also provides an assembly device for fixing a diaphragm to a skirt of a servomotor as described above. The device is characterized in that it comprises at least:

a first disk which presses against the side of the diaphragm which is opposite from the bead and from the recess to urge the diaphragm axially into contact with the skirt so as to hold the bead in the groove inside the recess; and a second disk, arranged facing the first disk, which second disk is provided, facing the recess, with at least one peripheral crimping tool which serves to crimp the two opposite outer edges of the recess towards each other locally at the neck of the bead so that the corresponding edges of the internal groove fit snugly onto the neck and hold the bead stationary in the groove.

According to other characteristics of the device:

each crimping tool has at least two opposite jaws that are mutually aligned substantially in the radial direction, and that are arranged at a determined axial position to crimp the two outer edges of the recess towards each other locally at the neck;

each crimping tool has a fixed abutment arm which is arranged in set-back manner between the jaws, and whose end has a concave abutment surface that is complementary to the convex outside wall of the rounded end-wall of the recess, so as to hold the recess while the edges of the internal groove are being flattened;

each jaw is shaped to form a cylinder portion disposed tangentially to the bead, of curvature substantially equal to the curvature of an associated groove of the neck, and each jaw is carried by the end of a respective arm which is mounted to pivot on the second disk about a pivot having an axis tangential to the radial direction;

each arm is shaped in the form of a substantially rectilinear bar, the pivot is arranged at that end of the arm which is opposite from the jaw, and the first disk is mounted to move towards the second disk to cause the arms to be moved towards each other and to cause the jaws to close;

each arm is substantially angle-bracket-shaped, the pivot is arranged at the angle of the angle bracket, and that end of the angle bracket which is opposite from the jaw is provided with a wheel which is suitable for being urged axially by a third disk mounted to slide axially in the second disk towards the fixed first disk in order to cause the jaws to move towards each other;

the jaws are mounted at first ends of second arms whose opposite second ends are mounted to slide radially towards each other on the second disk;

the second end of each arm is provided with a threaded portion which serves to co-operate with a worm screw that extends radially and that is motor-driven in order to make it possible to move the second end radially on the second disk;

the device includes at least two parallel rollers mounted to turn on the second disk, the axes of the rollers being moveable between a spaced-apart position in which the rollers are spaced apart from each other to allow the recess to pass between the rollers, and a close-together position in which the axes of the rollers are moved close together and in which the rollers are turned in mutually opposite directions so that cylindrical bearing surfaces at the ends of the rollers, which surfaces form the jaws and are spaced apart by spacing corresponding to the extent to which the two outer edges of the recess are to be brought towards each other, cause the edges of the internal groove to be flattened onto the neck of the bead; and the second disk is provided with a plurality of crimping tools distributed angularly in uniform manner.

Finally, the invention provides a method of assembling a diaphragm to a skirt of a servomotor by means of an assembly device as defined above, the method being characterized in that it comprises:

a first step during which the diaphragm is deposited on the first disk;

a second step during which the skirt is deposited on the diaphragm and on the first disk by causing the bead to penetrate into the groove in the recess;

a third step during which the jaws of the crimping tool are brought to either side of the two outer edges of the recess at the neck of the bead by moving the first and second disks towards each other in a determined relative angular position;

a fourth step during which the jaws of the crimping tool are brought towards each other to crimp the groove locally onto the neck of the bead;

a fifth step during which the jaws of the crimping tool are moved apart;

at least one sixth step during which the first and second disks are caused to pivot relative to each other into another relative angular position;

at least one seventh step during which the jaws of the crimping tool are brought, once again, to either side of the two outer edges of the recess, in said other relative angular position;

at least one eighth step during which the jaws of the crimping tool are moved towards each other to crimp the groove locally onto the neck of the bead in said other relative angular position;

a penultimate step during which the jaws of the crimping tool are moved apart, and in which the first and second disks are moved apart; and a last step during which the assembly comprising the diaphragm secured to the skirt is extracted.

Other characteristics and advantages of the invention appear on reading the following detailed description which is made easier to understand by referring to the accompanying drawings, in which:

FIG. 4 is a section view of a first embodiment of a crimping tool of the device for assembling a diaphragm, the tool being shown with its jaws in the open position;

FIG. 5 is a section view of the crimping tool of FIG. 4, shown with its jaws in the closed position;

FIG. 6 is a section view of a second embodiment of a crimping tool for a device for assembling a diaphragm, the tool being shown with its jaws in the open position;

FIG. 7 is a section view of the crimping tool of FIG. 6, shown with its jaws in the closed position;

FIG. 8 is a section view of a third embodiment of a crimping tool for a device for assembling a diaphragm, the tool being shown with its jaws in the open position;

FIG. 9 is a section view of the crimping tool of FIG. 8, shown with its jaws in the closed position;

In the following description, like references designate parts that are identical or that have similar functions.

By convention, the terms "front" and "back" respectively designate elements or positions disposed respectively towards the left and the right of the figures.

Figure 1:
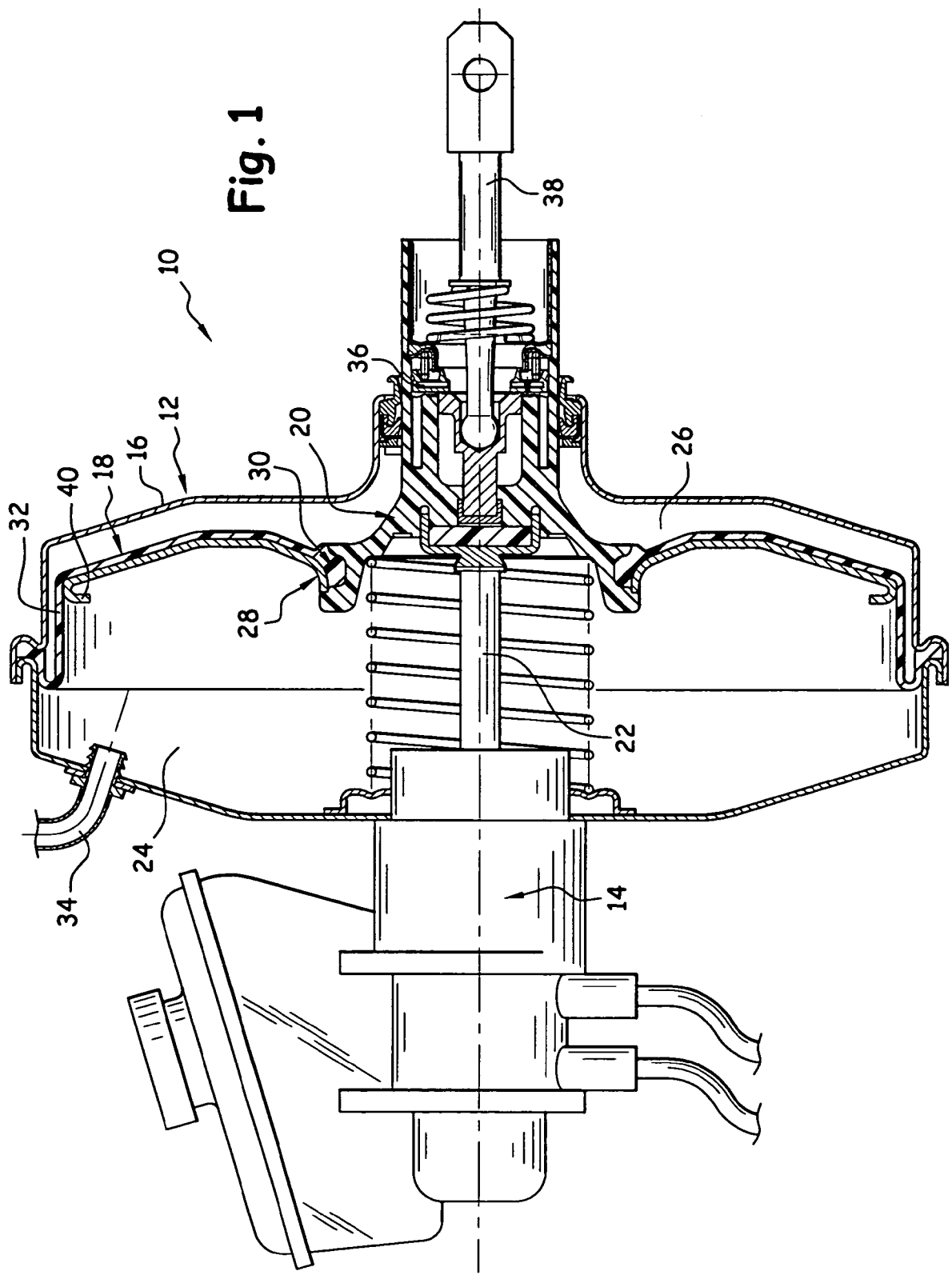
FIG. 1 is a section view of a prior art servomotor.

FIG. 1 shows a servobrake 10 including a servomotor 12 serving to actuate a master cylinder 14 for braking the vehicle.

In known manner, the servomotor 12 has a substantially cylindrical rigid casing 16 inside which a transverse partition 18 is movably mounted that is coupled to an actuating rod 22 for actuating the associated master cylinder 14.

The transverse partition 18 defines a front pressure chamber 24 and a back pressure chamber 26 in leaktight manner in the casing 16, which chambers are suitable for being subjected to different pressures in order to actuate the actuating rod 22 for actuating the associated cylinder.

For example, the front pressure chamber 24 is suitable for being subjected to a suction pressure delivered by an intake manifold (not shown) of an engine of the vehicle, to which manifold it is connected via a pipe 34, and the back pressure chamber 26 is suitable for being put into communication with the ambient medium subjected to atmospheric pressure via a three-port valve 36 controlled by a control rod 38 of the servomotor 12, so that the pressure difference between the front chamber 24 and the rear chamber 26 causes the moving partition 18 to move.

More particularly, the moving transverse partition 18 is provided with a central piston 20 secured to a sheet-metal peripheral skirt 28 which is covered, at least in the vicinity of its periphery 40, with a sealing diaphragm 30 made of an elastomer material and having a periphery 32 fixed to the casing 16 in leaktight manner.

Conventionally, as shown in FIG. 1, the diaphragm is fixed in two zones, firstly to the skirt of the servomotor where the skirt meets the central piston, and secondly to the periphery of the skirt.

This design makes it necessary for the diaphragm to cover the skirt entirely. In addition, it raises numerous sealing problems, firstly where the skirt meets the piston (where sealing must be provided between all three elements), and secondly at the periphery of the skirt, which periphery constitutes a zone along which the diaphragm, as fixed over its periphery to the casing of the servomotor, is subjected to high traction forces.

In order to remedy that drawback, the invention proposes a servomotor of the above-described type and that includes improved sealing means that are interposed between the skirt and the diaphragm in an intermediate portion of the skirt.

To this end, as shown in FIGS. 4 to 11, the invention proposes a servomotor of the above-described type, characterized in that the skirt 28 is provided, in the vicinity of the periphery 40, with a stamped annular recess 42 defining an internal groove 44 that serves to receive snugly a peripheral bead 46 that projects from the surface of the diaphragm 30 for fixing said diaphragm 30 in leaktight manner to the skirt 28.

More particularly, in the vicinity of the surface 48 of the skirt, the recess 42 has outer edges 50 that are designed to be pushed in towards each other to crimp the internal groove 44 locally, as shown in FIGS. 4 to 11, onto a neck 52 in the bead 46, so as to prevent the diaphragm 30 from moving axially relative to the skirt 28.

In the preferred embodiment of the invention, the neck 52 comprises two mutually opposite curved grooves 51 which are aligned perpendicularly to the general axial direction of the bead, but such a configuration is not limiting to the invention, it being possible for the bead to be provided with a single groove 51 or else with two mutually opposite grooves 51 of shape different from the curved shape.

In the preferred embodiment of the invention, the walls 54 of the recess 42 meet at a substantially rounded end-wall 56. In addition, the bead 46 has a rounded end 58 organized on the side of the neck 52 remote from the diaphragm surface 30, which end is complementary to the rounded end-wall 56 of the recess 42 inside the groove 44. This configuration makes it possible, as explained below, to guarantee that the bead 46 bears as securely as possible against the recess 42, thereby preventing it from slipping while the two edges 50 are being pushed in towards each other.

The invention also relates to an assembly device 60 for fixing a diaphragm 30 to a skirt 28 of a servomotor 10 as described above.

Such an assembly device 60 is shown in FIGS. 2 to 11.

In general, the device 60 includes a first disk 62 having an axis "D" and that serves to urge the diaphragm 30 axially into contact with the skirt 28 on its side opposite from its side on which the bead 46 and the recess 42 are disposed, so as hold the bead 46 in the groove 44 inside the recess 42.

The device 60 further includes at least one second disk 64 having the axis "D" as its axis, and that is arranged facing the first disk 62. Facing the recess 42, the second disk is provided with at least one peripheral crimping tool 66 which serves to push the two opposite edges 50 of the recess 42 towards each other locally so that the corresponding edges 53 of the internal groove 44 fit snugly around the neck 52 and hold the bead 46 stationary in the groove 44 of the recess 42.

A plurality of embodiments of crimping tools may be devised. However, in all of the embodiments of the invention, each crimping tool 66 has at least two jaws 68 which are mutually opposite, which are aligned substantially along the radial direction, and which serve to push the two outer edges 50 of the recess towards each other locally at the neck 52.

In a first embodiment of the device 60, which embodiment is shown in FIGS. 2 to 5, and in a second embodiment that is shown in FIGS. 6 and 7, each crimping tool 66 has a fixed abutment arm 70 which is arranged in set-back manner between the jaws 68, and whose end 72 is provided with a concave abutment surface that is complementary to the convex outside wall of the rounded end-wall 56 of the recess 42 so as to hold the recess 42 while the edges 43 of the internal groove 44 are being pushed towards each other.

This configuration makes it possible to prevent the rounded end-wall 56 of the groove 42 from folding when the jaws 68 deform the recess 42.

In both of these embodiments, each jaw 68 is shaped to form a respective cylinder portion extending tangentially to the bead 46, and of curvature substantially equal to the curvature of a groove 51 associated with the neck 52, and is carried by the end of a respective arm 74 which is mounted to pivot on the second disk 64 about a respective pivot 76 having a respective axis "A" that is tangential to the radial direction.

Figure 3:
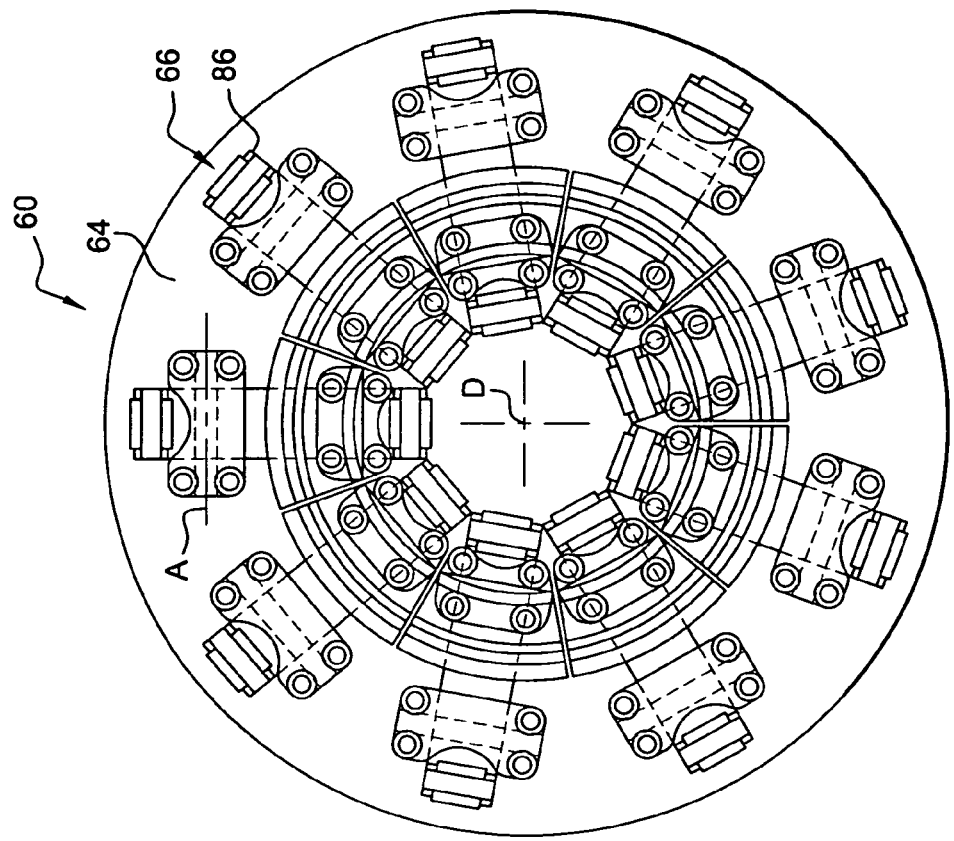
FIG. 3 is an axial end-on view of the second and third disks of the device of FIG. 2.

In the first embodiment of the invention, each arm 74 is substantially angle-bracket-shaped. The pivot 76 is arranged substantially at the angle 78 of the angle bracket, and that end 80 of the angle bracket which is opposite from the jaw 68 is provided with a wheel 82 which is suitable for being urged axially by a third disk 84 mounted to slide axially in the second disk 64 towards the fixed first disk 62 so as to cause the jaws 68 to move towards each other. For example, as shown in FIG. 3, the third disk 84 can drive the second disk 64 via pushers 86 which pass through the second disk 64.

In the second embodiment of the invention, as shown in FIGS. 6 and 7, each arm 74 is shaped to form a bar. The pivot 76 is arranged at that end 88 of the arm which is opposite from the jaw 68, and the first disk 62 is mounted to move towards the second disk 64 in order to cause the arms 74 to move towards each other and the jaws 68 to close.

In a third embodiment which is shown in FIGS. 8 and 9, the jaws 68 are mounted at first ends 90 of two arms 74 whose opposite second ends 82 are mounted to slide radially towards each other on the second disk 64.

In the configuration that is shown in FIGS. 8 and 9, the crimping tool 66 does not have a fixed abutment arm, but this provision is in no way limiting to the invention and it can be understood that the tool 66 can have a fixed abutment arm 70 of the above-described type.

For example, the second end 82 of each arm 74 is provided with a threaded portion 92 which serves to co-operate with a worm screw 93 that extends radially and that is motor-driven so as to enable the second end 92 to be moved radially over the second disk 64, and thus to enable the jaws 68 to be moved.

Each arm 74 can have a threaded portion serving to co-operate with an associated worm screw that is motor-driven independently from the other screw.

However, in the preferred embodiment of the invention, the threaded portions 92 of the two arms 74 are threaded in mutually opposite directions and they are associated with a common screw 93 having two sets of threads that are also in mutually opposite directions, so as to guarantee that the movements of the arms 74 are synchronized.

Figure 11:
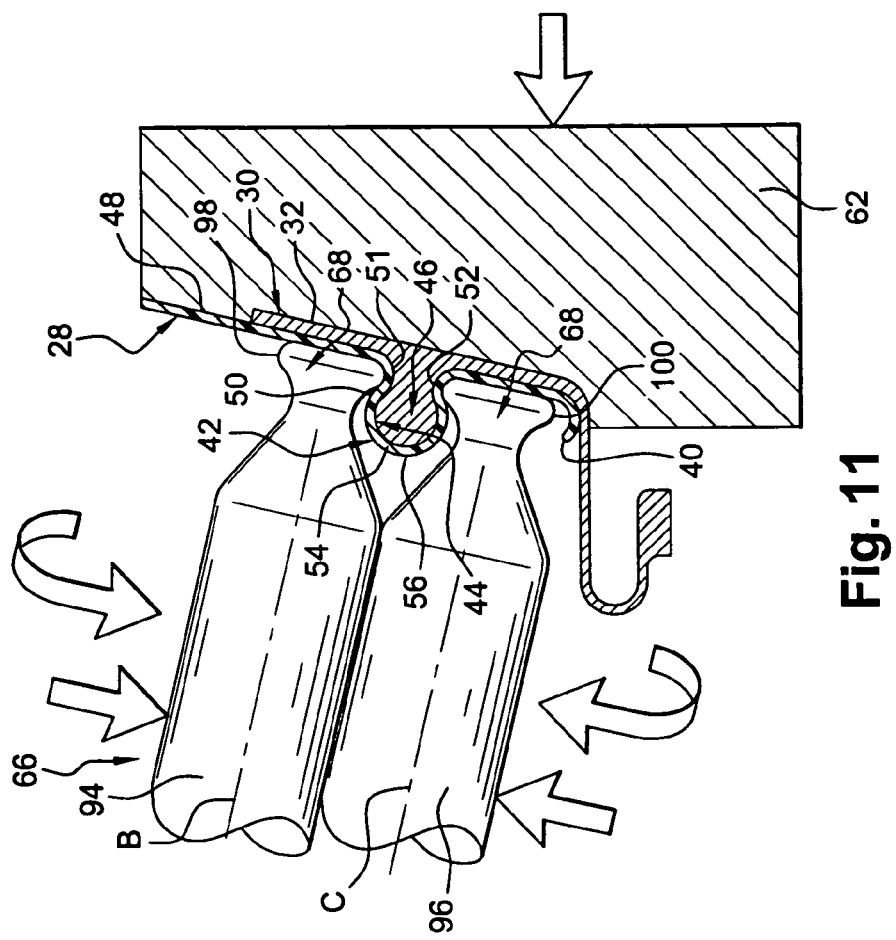
FIG. 11 is a section view of the crimping tool of FIG. 10, with its jaws in the closed position.
Figure 10:
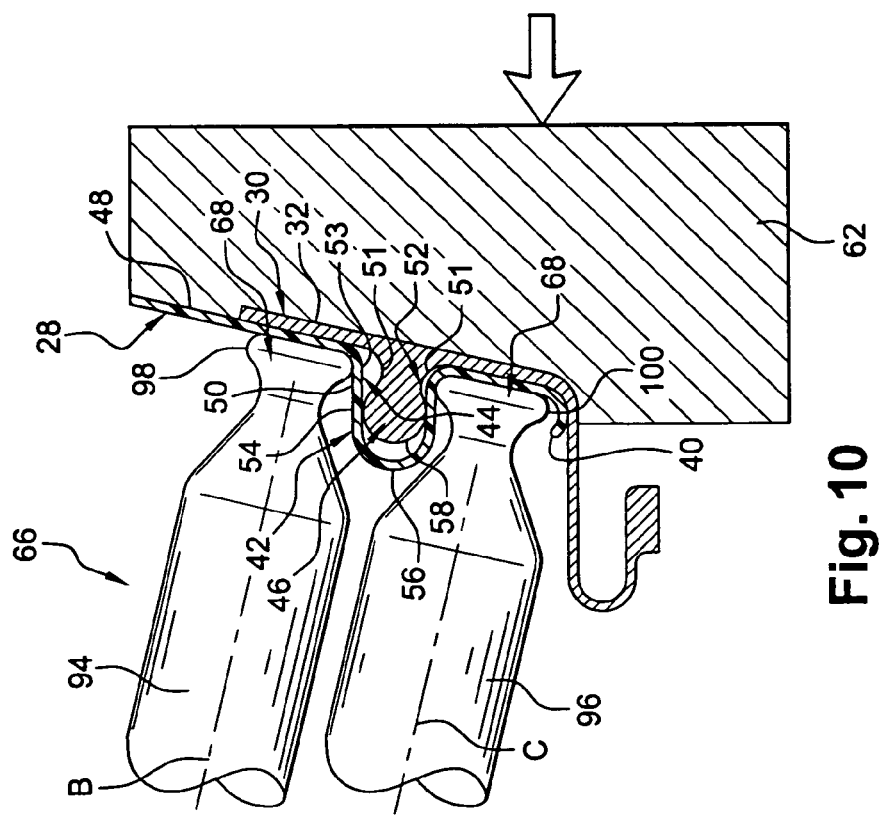
FIG. 10 is a section view of a fourth embodiment of a crimping tool for a device for assembling a diaphragm, the tool being shown with its jaws in the open position.

In a fourth embodiment of the invention which is shown in FIGS. 10 and 11, the assembly device 60 has at least two parallel rollers 94 and 96 which are mounted to turn on the second disk 64, and whose axes "B" and "C" are mounted to move radially between a spaced-apart position, shown in FIG. 10, in which the rollers 94, 96 are spaced apart from each other in order to allow the recess 42 to pass between the rollers 94, 96 as the disk 64 is advancing, and a close-together position, shown in FIG. 11, in which the axes "B", "C" of the rollers 94, 96 are moved closer together, and in which the rollers 94, 96 are turned in mutually opposite directions so that cylindrical bearing surfaces 98, 100 at the ends of the rollers 94, 96, which surfaces form the jaws 68 and are spaced apart by a spacing corresponding to extent to which the two outer edges 50 of the recess are to be brought towards each other, cause the edges 43 of the internal groove 44 to be flattened onto the neck 52 of the bead 46.

It can be understood that, in this fourth embodiment of the device 60, all of the means known from the state of art can be used to move the axes "B" and "C" of the rollers and to rotate the rollers 94, 96.

In all of the embodiments of the device 60, the second disk 64 is provided with a plurality of crimping tools 66 which are distributed angularly in uniform manner.

Figure 2:
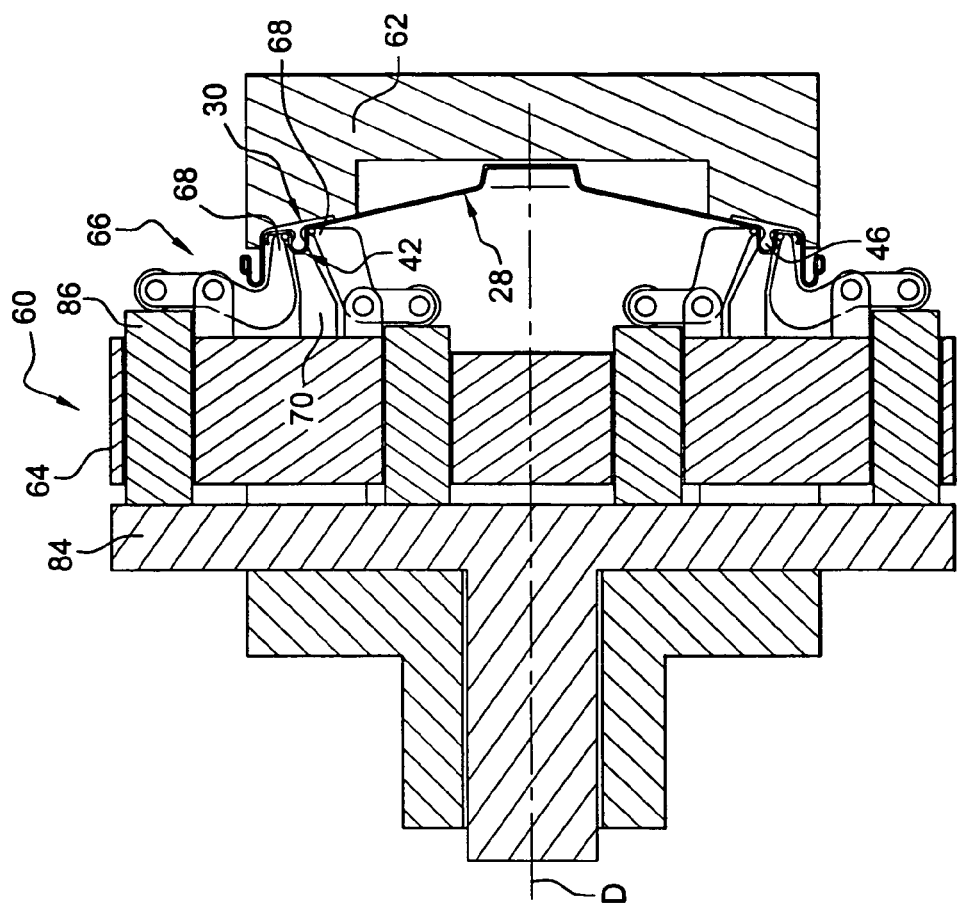
FIG. 2 is a section of a device for assembling a diaphragm to a skirt for a servomotor of the invention.

For example, the device can include nine tools 66 as shown in FIG. 2.

Finally, the invention relates to a method of assembling a diaphragm 30 to a skirt 28 of a servomotor 10 by means of an assembly device 60 as described above.

The method of the invention comprises:

a first step during which the diaphragm 30 is deposited on the first disk 62;

a second step during which the skirt 28 is deposited on the diaphragm 30 and on the first disk 62 by causing the bead 46 to penetrate into the groove 42;

a third step, shown in FIGS. 2, 4, 6, 8, and 10, during which the jaws 68 of the crimping tool are brought to either side of the two outer edges 50 of the recess 42 at the neck 52 by moving the first and second disks 62, 64 towards each other in a determined relative angular position;

a fourth step, shown in FIGS. 5, 7, 9, and 11, during which the jaws 68 of the crimping tool 66 are brought towards each other to crimp the groove 44 locally onto the neck 52 of the bead 46;

a fifth step during which the jaws 68 of the crimping tool are moved apart;

at least one sixth step during which the first and second disks 62, 64 are caused to pivot relative to each other into another relative angular position;

at least one seventh step during which the jaws 68 of the crimping tool 66 are brought, once again, to either side of the two outer edges 50 of the recess 42, in said other relative angular position, as shown in FIGS. 2, 4, 6, 8, and 10;

at least one eighth step during which the jaws 68 of the crimping tool 66 are moved towards each other to crimp the groove 44 locally onto the neck 52 of the bead 46 in said other relative angular position, as shown in FIGS. 5, 7, 9, and 11;

a penultimate step during which the jaws 68 of the crimping tool 66 are moved apart, and in which the first and second disks 62, 64 are moved apart; and a last step during which the assembly comprising the diaphragm 30 secured to the skirt 28 is extracted.

It can be understood that the method can include as many sixth, seventh, and eighth steps as necessary for all of the crimping tools 66 to crimp the recess 42 onto the bead 50 around its entire periphery.

In particular, the higher then number of tools 66, the lower the number of times the two disks 62 and 64 need to be turned relative to each other. For example, with a device of the type shown in FIG. 2, the disks 62 and 64 need to be turned relative to each other once only, the spacing between the jaws of two consecutive tools 66 being smaller than the width of a jaw 68, which makes it possible to crimp the entire recess 42 onto the bead 50 by turning the disks 62 and 64 relative to each other once only.

The invention thus makes it possible advantageously to fix a diaphragm 30 to a skirt 28 in leaktight manner and to assemble the two elements together strongly.

What is claimed:

1. A pneumatic servomotor (12) for power-assisted braking for a motor vehicle, having a substantially cylindrical rigid casing (16) inside which a moving transverse partition (18) is movably mounted that is coupled to an actuating rod (22) for actuating an associated master cylinder (14), and that defines in leaktight manner and inside the casing (16) two pressure chamberS (24, 26) in order to actuate the actuating rod (22), for actuating the associated master cylinder in which the moving transverse partition (18) has a central piston (20) that is secured to a peripheral skirt (28) which is made of sheet metal and which is covered, at least in the vicinity of its periphery (40), with a sealing diaphragm (30) made of an elastomer material and whose periphery (32) is fixed to the casing (16) in leaktight manner, said servomotor being characterized in that, in the vicinity of the periphery (40) of the skirt (28), said skirt is provided with a stamped annular recess (42) defining an internal groove (44) which serves to receive snugly a peripheral bead (46) which projects from the surface of the diaphragm (30) in order to fix said diaphragm (30) to the skirt (28) in leaktight manner, said recess (42) has outer edges (50) which serve to be flattened towards each other to close the internal groove (44) locally onto a neck (52) of the bead (46) to hold the diaphragm (30) stationary axially relative to the skirt (28), said bead (46) has a rounded end (58) arranged on the side of the neck (52) remote from the surface of the diaphragm, and that is complementary to the rounded end-wall (56) of the recess (42) inside the groove (44), said diaphragm (30) being fixed to the skirt (28) of the servomotor by an assembly device (60) comprising:

a first disk (62) which presses against the side of the diaphragm (30) which is opposite from the bead (46) and from the recess (42) to urge the diaphragm (30) axially into contact with the skirt (28) so as to hold the bead (46) in the groove (44) inside the recess (42); and a second disk (64), arranged facing the first disk (62), which second disk is provided, facing the recess (42), with at least one peripheral crimping tool (66) which serves to crimp the two opposite outer edges (50) of the recess (42) towards each other locally at the neck (52) of the bead so that the corresponding edges (53) of the internal groove (44) fit snugly onto the neck (52) and hold the bead (46) stationary in the groove (44).

2. The servomotor (12) according to claim 1, characterized in that the walls (54) of the recess (42) meet at a substantially rounded end-wall (56).

3. The servomotor according to claim 1 wherein said assembly device (60) is characterized in that each crimping tool (66) has at least two opposite jaws (68) that are mutually aligned substantially in the radial direction, and that are arranged at a determined: axial position to crimp the two outer edges (50) of the recess (42) towards each other locally at the neck (52).

4. The servomOtOr according to claim 3 wherein said assembly device (60) is characterized in that each crimping tool (66) has a fixed abutment arm (70) which is arranged in set-back manner between the jaws (68), and whose end (72) has a concave abutment surface that is complementary to the convex outside wall of the rounded end-wall (56) of the recess (42), so as to hold the recess (42) while the edges (43) of the internal groove (44) are being flattened.

5. The servomotor as recited in claim 4 wherein said assembly device (60) is characterized in that each jaw (68) is shaped to form a cylinder portion disposed tangentially to the bead (46), of curvature substantially equal to the curvature of an associated groove of the neck (52), and in that each jaw is carried by the end of a respective arm (74) which is mounted to pivot on the second disk about a pivot (16) having an axis (A) tangential to the radial direction.

6. The servomotor as recited in claim 5 wherein said assembly device (60) is characterized in that each arm (74) is shaped in the form of a substantially rectilinear bar, in that the pivot (76) is arranged at that end (88) of the arm (74) which is opposite from the jaw (68), and in that the first disk (62) is mounted to move towards the second disk (64) to cause the arms (74) to be moved towards each other and to cause the jaws (68) to close.

7. The servomotor as recited in claim 5 wherein said assembly device (60) is characterized in that each arm (74) is substantially angle-bracket-shaped, in that the pivot (76) is arranged at the angle (78) of the angle bracket, and in that that end (80) of the angle bracket which is opposite from the jaw (68) is provided with a wheel (82) which is suitable for being urged axially by a third disk (84) mounted to slide axially in the second disk (64) towards the fixed first disk (62) in order to cause the jaws (68) to move towards each other.

8. The servomotor as recited in claim 3 wherein said assembly device (60) is characterized in that the jaws (68) are mounted at first ends (90) of second arms (74) whose opposite second ends (82) are mounted to slide radially towards each other on the second disk (64).

9. The servomotor as recited in claim 8 wherein said assembly device (60) is characterized in that the second end

(82) of each arm is provided with a threaded portion (92) which serves to co-operate with a worm screw (93) that extends radially and that is motor-driven in order to make it possible to move the second end (82) radially on the second disk (64).

10. The servomotor as recited in claim 9 wherein said assembly device (60) is characterized in that it includes at least two parallel rollers (94, 96) mounted to turn on the second disk, the axes (B, C) of the rollers being moveable radially between a spaced-apart position in which the rollers (94, 96) are spaced apart from each other to allow the recess (42) to pass between the rollers (94, 96), and a close-together position in which the axes (B, C) of the rollers (94, 96) are moved close together and in which the rollers (94, 96) are turned in mutually opposite directions so that cylindrical bearing surfaces (98, 100) at the ends of the rollers (94, 96), which surfaces form the jaws (68) and are spaced apart by spacing corresponding to the extent to which the two outer edges (50) of the recess (42) are to be brought towards each other, cause the edges of the internal groove (44) to be flattened onto the neck (52) of the bead (46).

11. The servomotor as recited in claim 10 wherein said assembly device (60) is characterized in that the second disk (64) is provided with a plurality of crimping tools (66) distributed angularly in uniform manner.

12. The servomotor as recited in 11 wherein said diaphragm (30) is attached to a skirt (28) for the servomotor (12) by the following method:
 a first step during which the diaphragm (30) is deposited on the first disk (62);
 a second step during which the skirt (28) is deposited on the diaphragm (30) and on the first disk (62) by causing the bead (46) to penetrate into the groove (44) in the recess (42);
 a third step during which the jaws (68) of the crimping tool (66) are brought tO on either side of the two outer edges (50) of the recess (42) at the neck (52) of the bead (46) by moving the first and second disks (62, 64) towards each other in a determined relative angular position;
 a fourth step during which the jaws (68) of the crimping tool (66) are brought towards each other to crimp the groove (44) locally onto the neck (52) of the bead (46);
 a fifth step during which the jaws (68) of the crimping tool (66) are moved apart;
 at least one sixth step during which the first and second disks (62, 64) are caused to pivot relative to each other into another relative angular position;
 at least one seventh step during which the jaws (68) of the crimping tool (66) are brought, once again, to either side of the two outer edges (50) of the recess (42), in said other relative angular position;
 at least one eighth step during which the jaws (68) of the crimping tool (66) are moved towards each otter to crimp the groove (52) locally onto the neck (52) of the bead (46) in said other relative angular position;
 a penultimate step during which the jaws (68) of the crimping tool (66) are moved apart, and in which the first and second disks (62, 64) are moved apart; and
 a last step during which the assembly comprising the diaphragm (30) secured to the skirt (28) is extracted.

* * * * *